US012739514B2

(12) United States Patent
Tamura et al.

(10) Patent No.: US 12,739,514 B2
(45) Date of Patent: Sep. 15, 2026

(54) IMAGE CAPTURING APPARATUS, CONTROL METHOD THEREOF, AND STORAGE MEDIUM

(71) Applicant: CANON KABUSHIKI KAISHA, Tokyo (JP)

(72) Inventors: Yusuke Tamura, Tokyo (JP); Nobukazu Yoshida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 101 days.

(21) Appl. No.: 18/617,456

(22) Filed: Mar. 26, 2024

(65) Prior Publication Data

US 2024/0334069 A1 Oct. 3, 2024

(30) Foreign Application Priority Data

Mar. 30, 2023 (JP) ................................ 2023-056359

(51) Int. Cl.

*H04N 23/72* (2023.01)
*H04N 23/67* (2023.01)
*H04N 23/73* (2023.01)
*H04N 23/745* (2023.01)
*H04N 23/75* (2023.01)

(52) U.S. Cl.

CPC ........... *H04N 23/72* (2023.01); *H04N 23/672* (2023.01); *H04N 23/73* (2023.01); *H04N 23/745* (2023.01); *H04N 23/75* (2023.01)

(58) Field of Classification Search

CPC ........ H04N 23/72; H04N 23/75; H04N 23/70; H04N 23/73; H04N 23/745; H04N 23/71; H04N 23/672

See application file for complete search history.

(56) References Cited

U.S. PATENT DOCUMENTS

2009/0295940 A1* 12/2009 Shibuno ................ G03B 17/00 348/340
2022/0337736 A1* 10/2022 Sugawara ............. H04N 23/73
2022/0351395 A1* 11/2022 Inagaki .................. H04N 23/54
2022/0353405 A1* 11/2022 Kobayashi ........... H04N 23/745

FOREIGN PATENT DOCUMENTS

JP 2015111252 A 6/2015

* cited by examiner

*Primary Examiner* — Lin Ye
*Assistant Examiner* — Steven Daniel Barry
(74) *Attorney, Agent, or Firm* — Canon U.S.A., Inc. IP Division

(57) ABSTRACT

An apparatus includes a sensor, a flicker detection unit that detects a flicker using an image captured by the sensor, a focus detection unit that detects an in-focus state of the subject image, and a first determination unit that determines, in a case where the focus detection unit detects an in-focus state, which of a setting of an exposure time of the sensor to an exposure time in which a flicker is inconspicuous and an opening of a diaphragm of an optical system to give priority to based on a detection result of a flicker by the flicker detection unit, and, based on the determination, determines a combination of an exposure time of the sensor and a diaphragm value of the optical system.

16 Claims, 5 Drawing Sheets

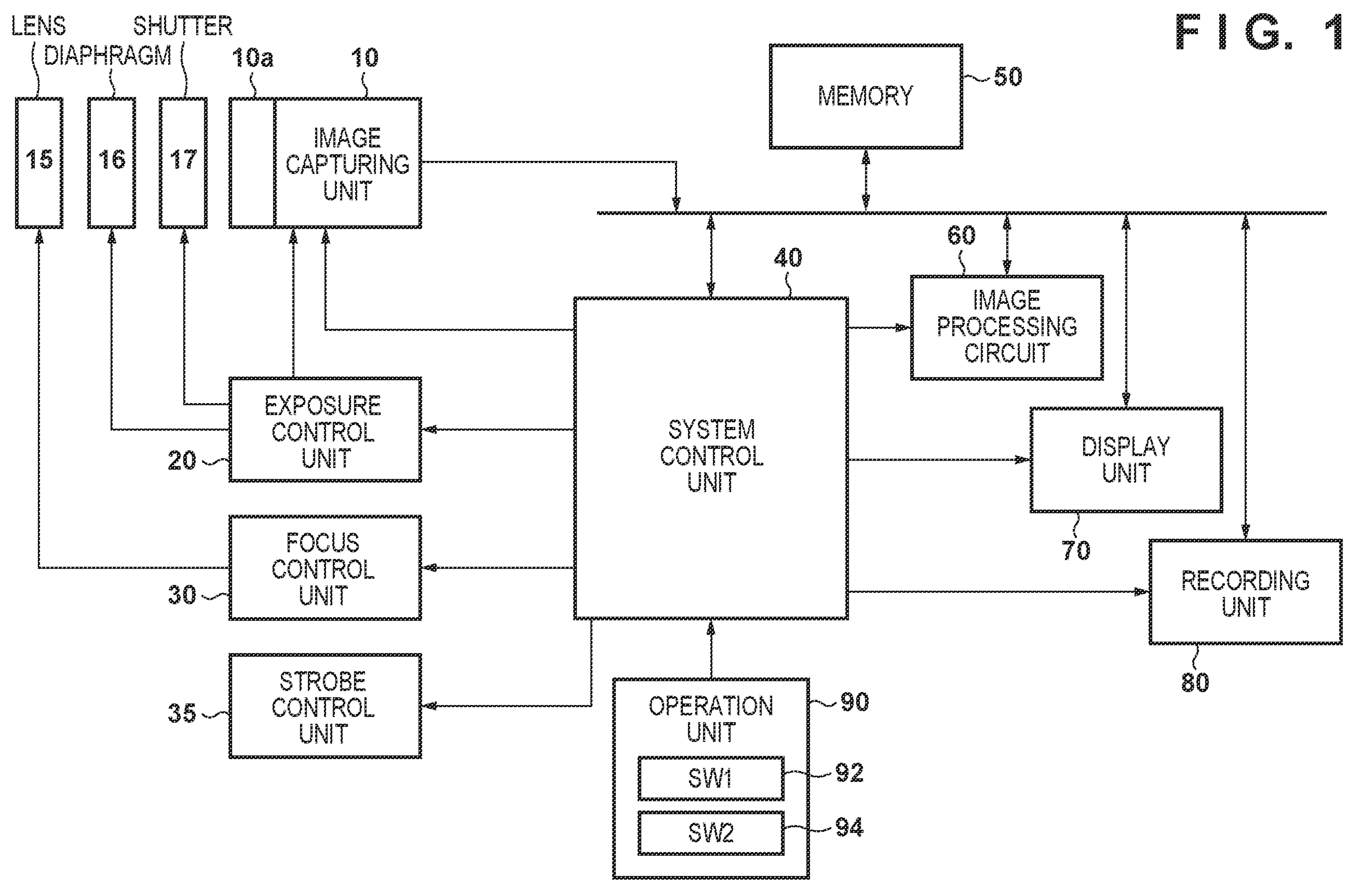
F I G. 1
LENS
DIAPHRAGM
SHUTTER
15
16
17
10a
10
IMAGE CAPTURING UNIT
MEMORY
50
40
60
IMAGE PROCESSING CIRCUIT
EXPOSURE CONTROL UNIT
20
SYSTEM CONTROL UNIT
DISPLAY UNIT
70
FOCUS CONTROL UNIT
30
RECORDING UNIT
80
STROBE CONTROL UNIT
35
OPERATION UNIT
90
SW1
92
SW2
94

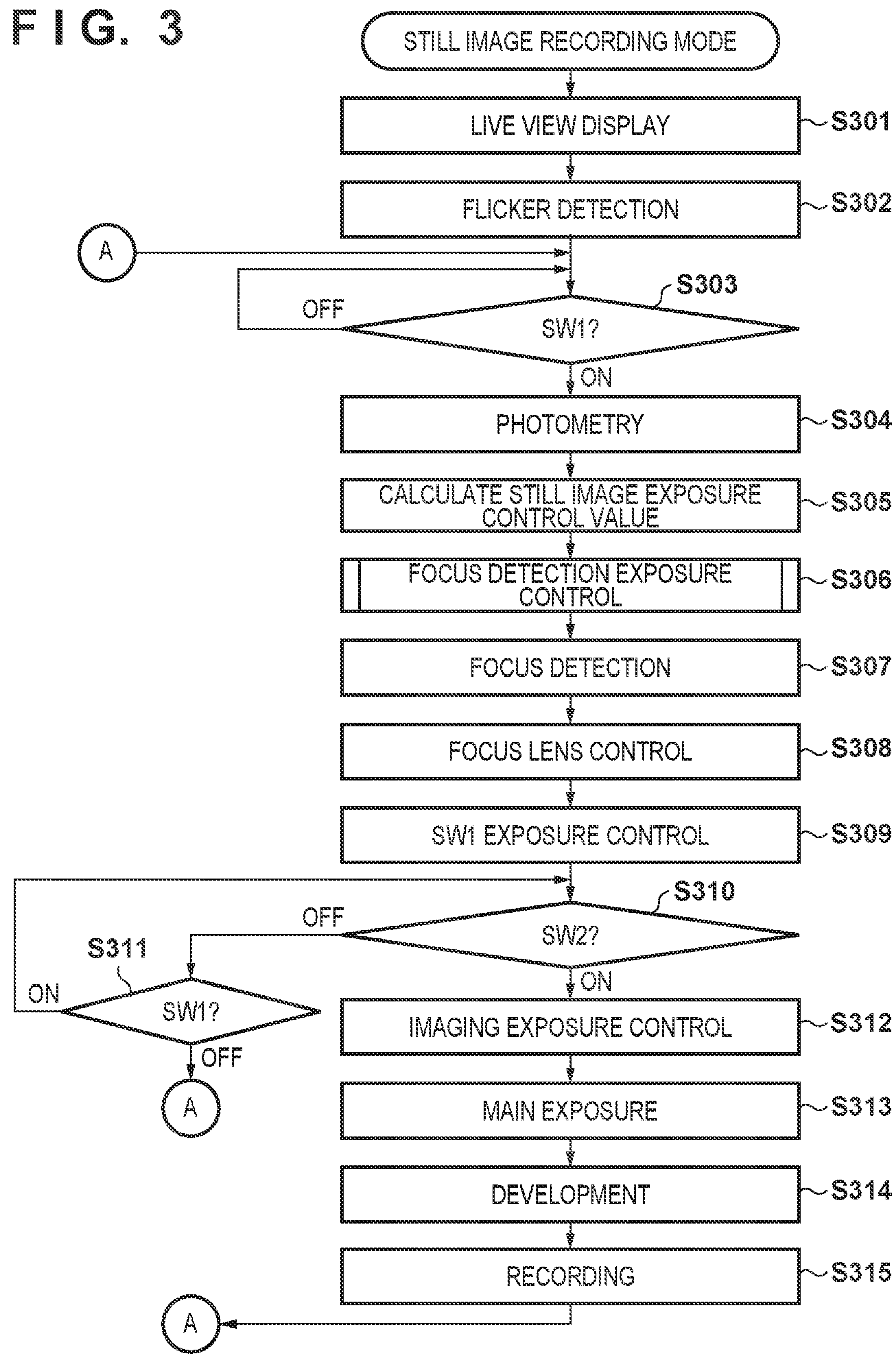
F I G. 3
STILL IMAGE RECORDING MODE
LIVE VIEW DISPLAY
S301
FLICKER DETECTION
S302
A
S303
OFF
SW1?
ON
PHOTOMETRY
S304
CALCULATE STILL IMAGE EXPOSURE CONTROL VALUE
S305
FOCUS DETECTION EXPOSURE CONTROL
S306
FOCUS DETECTION
S307
FOCUS LENS CONTROL
S308
SW1 EXPOSURE CONTROL
S309
S310
OFF
SW2?
ON
S311
ON
SW1?
OFF
A
IMAGING EXPOSURE CONTROL
S312
MAIN EXPOSURE
S313
DEVELOPMENT
S314
RECORDING
S315
A

IMAGE CAPTURING APPARATUS, CONTROL METHOD THEREOF, AND STORAGE MEDIUM

BACKGROUND

Technical Field

The aspect of the embodiments relates to a focus detection technique in an image capturing apparatus.

Description of the Related Art

Alight source such as a fluorescent lamp repeats blinking at a frequency of an alternating-current power source. Therefore, when imaging is performed using an image capturing apparatus such as a camera under a fluorescent lamp light source, a flicker occurs in accordance with a shutter speed (accumulation time). Some known image capturing apparatuses perform a flicker removal countermeasure even during focus detection when a flicker is detected.

Here, as a flicker removal countermeasure, it is effective to set the accumulation time of an image capturing element to an integral multiple of the blinking cycle of the light source. However, the blinking cycle of the light source is a relatively long time such as 1/100 sec, for example, and if the accumulation time is set to a relatively long time so as to be this integral multiple, there is a need for largely narrowing the diaphragm when the brightness of the subject is high. On the other hand, in focus detection, the focus detection accuracy becomes higher when the diaphragm is opened such that the depth of field becomes shallow. That is, the focus detection accuracy is lowered when the accumulation time is lengthened for the flicker countermeasure and the diaphragm is narrowed, and meanwhile, there is a case where the flicker countermeasure will not be sufficiently performed if the diaphragm is opened to ensure the focus detection accuracy. In particular, when focus detection is performed while performing live view display, if the flicker countermeasure is not sufficient, the image quality of the live view display is lowered. On the other hand, if the live view image quality is emphasized, the focus detection accuracy is lowered. There is a trade-off relationship between the image quality of live view display and the focus detection accuracy.

On the other hand, Japanese Patent Laid-Open No. 2015-111252 discloses the following technique as a flicker countermeasure that does not control the accumulation time during focus detection. That is, when focus detection by a phase difference using a focus detection pixel is performed, an influence of a flicker is reduced by having the frame rate in the flicker frequency.

However, in the known technique disclosed in Japanese Patent Laid-Open No. 2015-111252 described above, a flicker fringe of a fixed pattern remains, and there is an issue that lowering in the quality of live view display cannot be avoided.

SUMMARY

According to a first aspect of the embodiments, there is provided an apparatus comprising: a sensor that captures a subject image formed by an optical system; and at least one processor; and a memory coupled to the at least one processor storing instructions that, when executed by the at least one processor, cause the at least one processor to function as: a detection unit that detects a flicker using an image captured by the sensor, a detection unit that detects an in-focus state of the subject image by using a light flux that has passed through the optical system, and a first determination unit that determines, in a case where the detection unit detects the in-focus state, which of a setting of an exposure time of the sensor to an exposure time in which a flicker is inconspicuous and an opening of a diaphragm of the optical system to give priority to based on a detection result of a flicker by the detection unit, and, based on the determination, determines a combination of an exposure time of the sensor and a diaphragm value of the optical system.

According to another aspect of the embodiments, there is provided a method for controlling an apparatus including a sensor that captures a subject image formed by an optical system, the method comprising: executing flicker detection for detecting a flicker by using an image captured by the sensor; executing focus detection for detecting an in-focus state of the subject image by using a light flux that has passed through the optical system; and determining, in a case of detecting the in-focus state in the focus detection, which of a setting of an exposure time of the sensor to an exposure time in which a flicker is inconspicuous and an opening of a diaphragm of the optical system to give priority to based on a detection result of a flicker by the flicker detection, and, based on the determination, determining a combination of an exposure time of the sensor and a diaphragm value of the optical system.

Further features of the disclosure will become apparent from the following description of exemplary embodiments with reference to the attached drawings.

BRIEF DESCRIPTION OF THE DRAWINGS

FIG. 1 is a view illustrating a configuration of an image capturing apparatus according to an embodiment of the present disclosure.

FIG. 2 is a view illustrating pixel arrangement of an image capturing element.

FIG. 3 is a flowchart showing an example of a still image imaging operation.

DESCRIPTION OF THE EMBODIMENTS

Figure 4A:
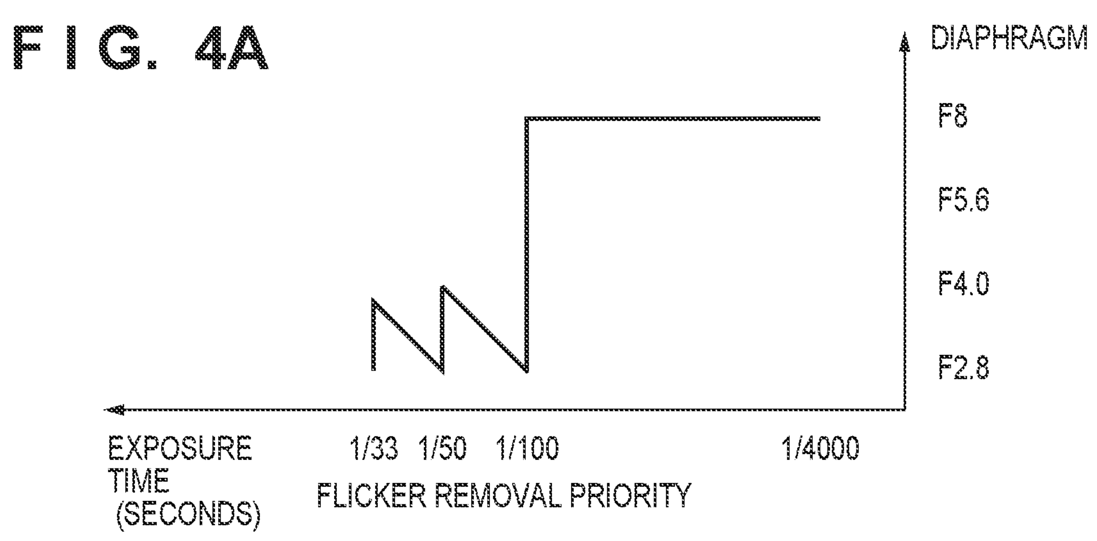
FIGS. 4A to 4C is a program diagram for calculating an exposure control value.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

FIG. 1 is a view illustrating the configuration of the image capturing apparatus according to an embodiment of the present disclosure.

Figure 2:
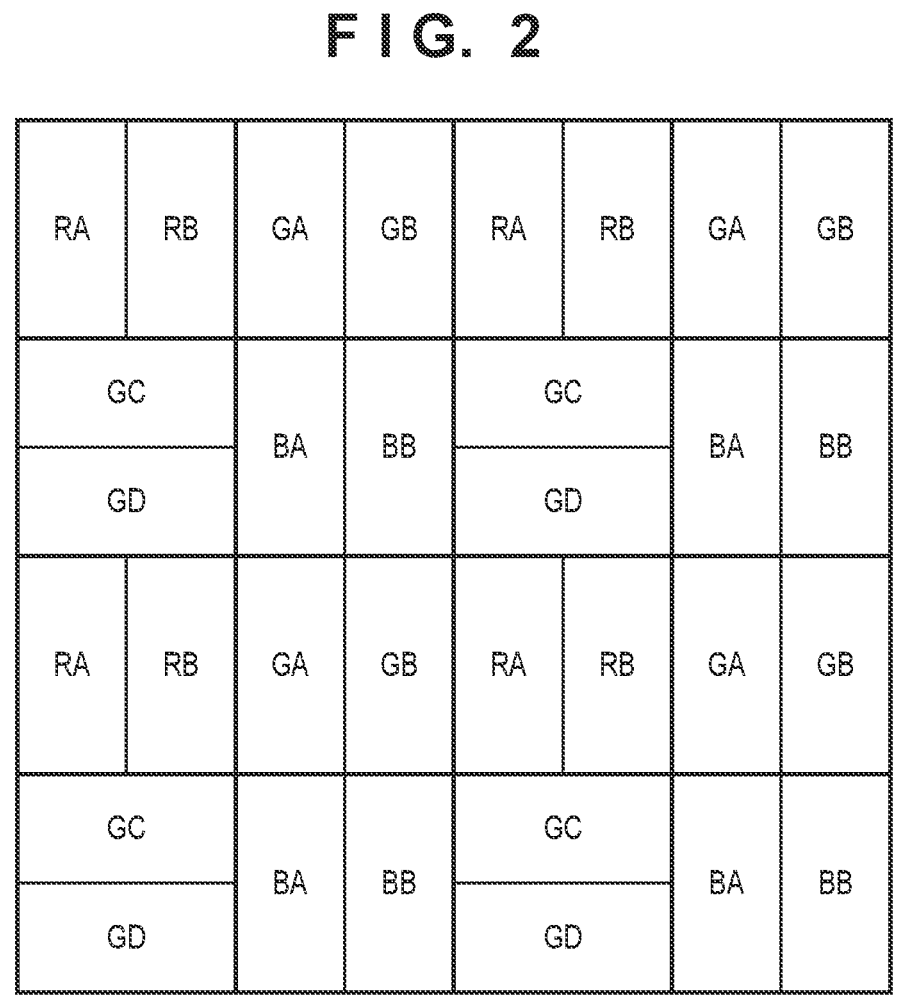

In FIG. 1, an image capturing unit 10 includes an image capturing element 10*a* that receives light and performs photoelectric conversion, and an A/D conversion unit that converts, into a digital signal, an analog image signal output from the image capturing element 10*a*. Then, digitalized image data is output. The image capturing element 10*a* has two photodiodes in one pixel as illustrated in FIG. 2 in order to perform image capturing plane phase difference autofocus (AF).

FIG. 2 illustrates a configuration in which each of pixels of red (R), green (G), and blue (B) of 4×4 of the Bayer array includes two photodiodes of RA and RB, BA and BB, and GA and GB (or GC and GD). Two image signals (image A and image B, or image C and image D) for AF can be generated by separating a light flux from an image capturing optical system by a microlens and receiving, by two photodiodes, light passing through different regions of an exit pupil region. An image processing circuit 60 described later performs correlation calculation on the two image signals, whereby an image shift amount and various types of information can be calculated.

The image A and the image B are signals of regions subjected to pupil division in the lateral direction (horizontal direction), and the image C and the image D are signals of regions subjected to pupil division in the longitudinal direction (vertical direction), and it is possible to detect image shift amounts in different directions. An addition signal of the image A+image B or the image C+image D can also be used as an image capturing signal.

Returning to the description of FIG. 1, the light received by the image capturing unit 10 is light having passed through a lens group 15 including a focus lens, a diaphragm 16, and a shutter 17 and having been formed by the image capturing unit 10. The shutter 17 and the diaphragm 16 are controlled by an exposure control unit 20, and the focus lens in the lens group 15 is controlled by a focus control unit 30. The exposure control unit 20 can also control the accumulation time and the amplification factor (sensitivity) of a pixel signal with respect to the image capturing unit 10. A strobe control unit 35 can cause a strobe to emit light, and the image capturing unit 10 can capture reflected light from the subject.

The image capturing element 10*a* includes a CMOS sensor, and a rolling electronic shutter that reads a screen for each line in the horizontal direction is used as a method of an electronic shutter. Under a light source whose brightness cyclically changes with time such as a fluorescent lamp, a flicker in a lateral (horizontal direction, reading direction) fringe shape occurs in the image capturing plane due to a difference in time at which accumulation and reading are performed for each line. The flicker can be removed by setting the accumulation time of the image capturing element 10*a* to an integral multiple of the blinking cycle of the light source (integral multiple of the flickering cycle) and aligning the exposure amount for each horizontal line. For example, a fluorescent lamp connected to a power source of 50 Hz generates a flicker of 100 Hz, and the generation of flicker can be suppressed by setting the accumulation time to an integral multiple of 1/100 [sec]. However, even if the accumulation time of the image capturing element 10*a* is not accurately set to an integral multiple of the blinking cycle (flickering cycle) of the light source, the flicker can be made inconspicuous by setting the accumulation time to a time close to an integral multiple of the flickering cycle (flickering cycle) of the light source.

The image data output from the image capturing unit 10 is input to the image processing circuit 60 and stored in a memory 50 at the same time. The image data once stored in the memory 50 can be read again, and a system control unit 40 can refer to the image data and input the read image data to the image processing circuit 60. Furthermore, the system control unit 40 can also write the image data subjected to the image processing by the image processing circuit 60 back to the memory 50 and write arbitrary data into the memory 50.

The image processing circuit 60 has the following functions.

Output a brightness histogram of an input image.

Detect a subject such as a face by extracting a feature of the input image.

Apply gamma correction to the input image.

Synthesize a plurality of images read from the memory 50.

Output a phase difference AF evaluation value from a phase difference detection signal having been input.

Output a flicker detection evaluation value from the input image.

A display unit 70 can perform D/A conversion on digital image data subjected to image processing by the image processing circuit 60 and stored in the memory 50, and display the digital image data onto a display device such as a liquid crystal display. It is possible to display not only image data but also arbitrary information alone or together with an image, and it is also possible to display exposure information at the time of imaging and display a frame in a detected face region.

A recording unit 80 can store imaged image data into a recording medium.

An operation unit 90 includes a shutter button for giving an imaging instruction in particular, and the shutter button includes shutter switches SW1 (92) and SW2 (94). The shutter switch SW1 (92) is turned on in the middle of operation of the shutter button, and instructs start of an imaging preparation operation such as automatic control of exposure and focus. The shutter switch SW2 (94) is turned on when the operation of the shutter button is completed, and instructs still image imaging. In addition, a mode selector switch for switching a camera operation mode such as a still image imaging mode, a moving image imaging mode, and a reproduction mode, a parameter selection switch that can change camera settings, and the like are included.

FIG. 3 is a flowchart showing an example of the still image imaging operation.

In step S301, the system control unit 40 starts live view display onto the display unit 70 using the image data captured by the image capturing unit 10.

In step S302, the system control unit 40 performs flicker detection using the image processing circuit 60. The image processing circuit 60 acquires an evaluation value for flicker detection using the image data captured by the image capturing unit 10, and calculates the presence or absence of a flicker from the acquired evaluation value and, if present, the frequency thereof. In the calculation of the frequency of the flicker, the frequency may be calculated from a change in a signal value in a plane of one piece of image data, or the frequency may be calculated from a change in a signal value of a plurality of temporally continuous images.

In step S303, the system control unit 40 determines whether or not the shutter switch SW1 is turned on. If the shutter switch SW1 is on, the system control unit 40 proceeds with the processing to step S304, and otherwise, stands by as it is.

In step S304, the system control unit 40 performs photometry processing and calculates a brightness value of the subject (hereinafter, subject brightness). The subject brightness is calculated from a brightness signal value of image data output from the image capturing unit 10 and an exposure condition at the time point when the image is exposed.

In step S305, the system control unit 40 determines an exposure control value (diaphragm, accumulation time, and sensitivity) for a still image. The exposure control value of the still image is calculated based on the subject brightness calculated in step S304 and a program diagram different for each imaging mode of the camera.

Figure 4B:
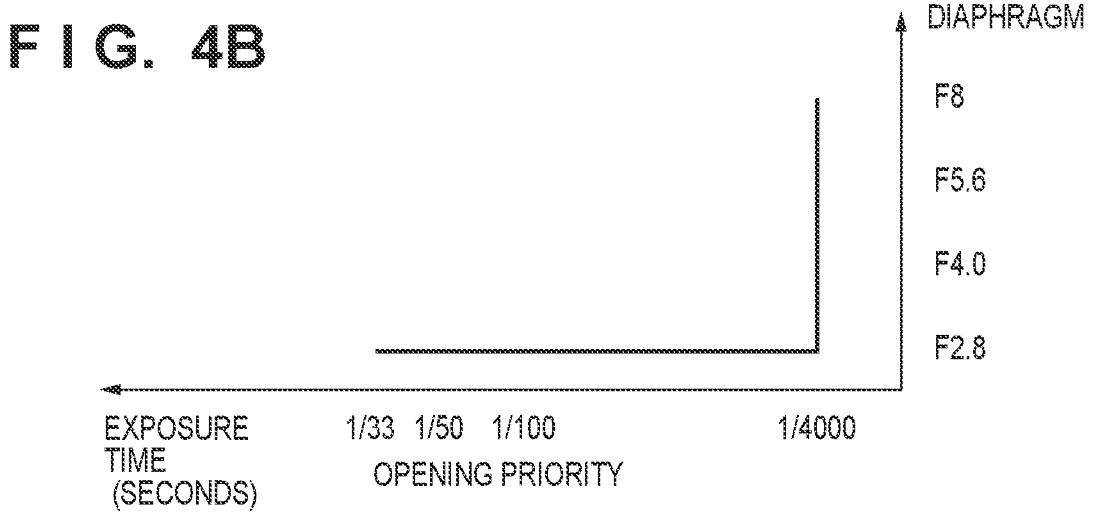
Figure 4C:
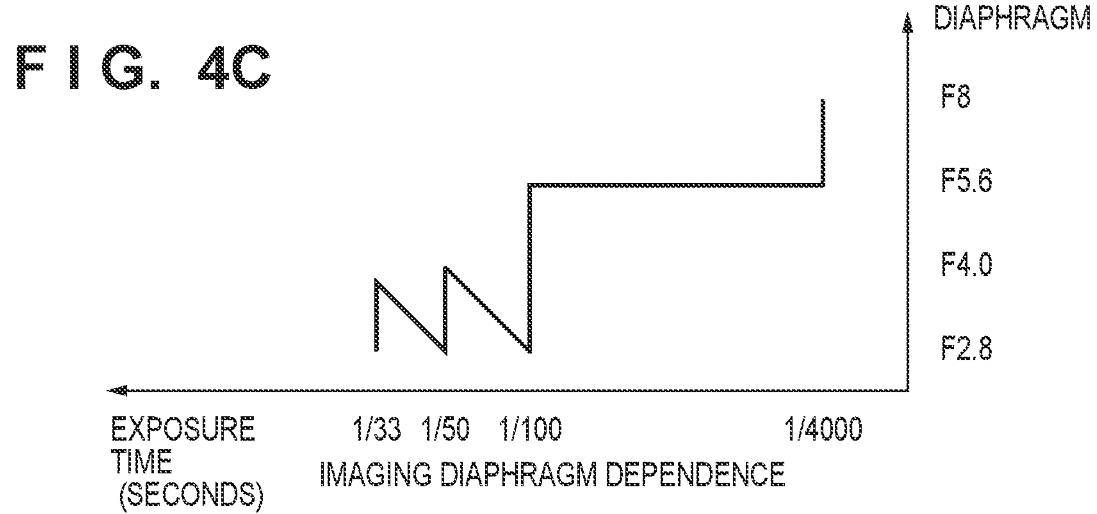

The program diagram defines a combination of exposure control values as illustrated in FIGS. 4A to 4C, and a set of exposure control values that becomes a correct exposure value can be obtained from the program diagram. For example, FIG. 4A is a program diagram where the diaphragm is changed from F2.8 to F8 at an accumulation time of 1/100 [sec], and FIG. 4B is a program diagram where the accumulation time is changed from 1/33 [sec] to 1/4000 [sec] with diaphragm opening. The subject brightness having, for example, a diaphragm value F8 and an exposure time 1/100 [sec] in the program diagram of FIG. 4A has a diaphragm value F2.8 and an exposure time 1/800 [sec] in the program diagram of FIG. 4B. In one embodiment, the exposure time 1/100 [sec] is selected by using the program diagram of FIG. 4A, and the diaphragm value F2.8 is selected by using the program diagram of FIG. 4B. That is, the exposure control value can have different features depending on the program diagram.

In step S306, the system control unit 40 performs exposure control for focus detection. Although details will be described later with reference to FIG. 5, an exposure control value for focus detection is calculated, and exposure is performed so as to obtain the calculated exposure control value for focus detection.

In step S307, the system control unit 40 transfers, to a phase difference detection block in the image processing circuit 60, data of the image A and the image B, for detecting a defocus amount in the horizontal direction (lateral direction), and data of the image C and the image D, for detecting a defocus amount in the vertical direction (longitudinal direction), and calculates the phase difference AF evaluation value. Focus detection of the imaging optical system can be performed based on the phase difference AF evaluation value. In particular, focus detection can be performed using data of the image A and the image B, or focus detection can be performed also using data of the image C and the image D.

In step S308, the system control unit 40 performs control of the focus lens based on the focus detection result in step S307, and performs focus adjustment of the imaging optical system.

In step S309, the system control unit 40 changes the exposure control value from a value for focus detection to an exposure control value for live view display. Since the exposure control value for live view display is an exposure optimized for live view display and is possibly different from the exposure optimized for focus detection, the exposure control value is set here.

In step S310, the system control unit 40 determines whether or not the shutter switch SW2 is turned on. If the shutter switch SW2 is on, the system control unit 40 proceeds with the processing to step S312, and otherwise, proceeds with the processing to step S311.

In step S311, the system control unit 40 determines whether or not the shutter switch SW1 is turned on. If the shutter switch SW1 is on, the system control unit 40 returns the processing to step S310, and otherwise, returns the processing to step S303.

In step S312, the system control unit 40 sets the exposure control value to the exposure control value for the still image calculated in step S305.

In step S313, the system control unit 40 performs main exposure with the exposure control value set in step S312.

In step S314, the system control unit 40 performs development processing on the exposure data obtained in step S313 by using the image processing circuit 60.

In step S315, the system control unit 40 records the developed image data into the recording medium by using the recording unit 80.

Figure 5:
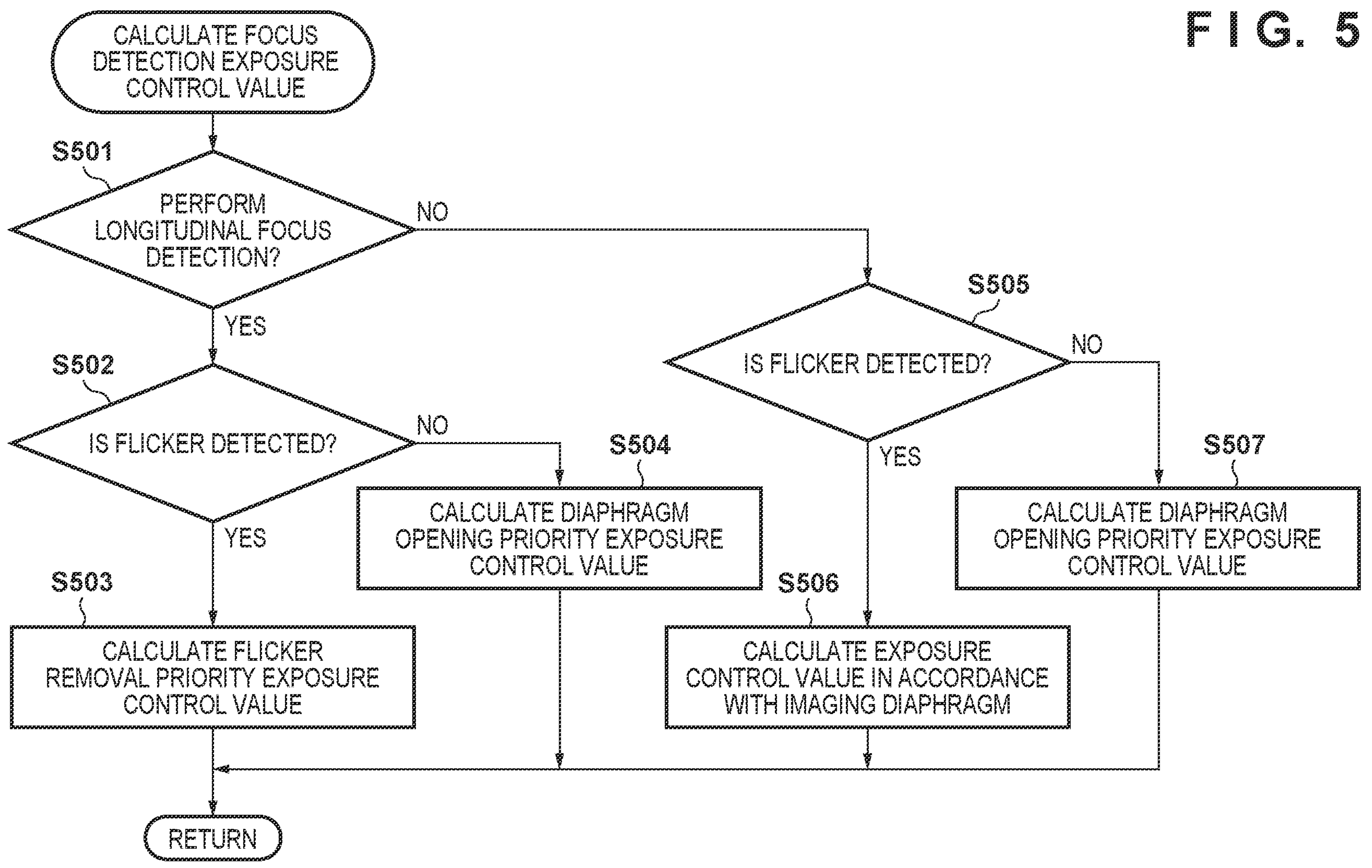
FIG. 5 is a flowchart showing calculation processing of a focus detection exposure control value.

FIG. 5 is a flowchart showing an example of the calculation processing of an exposure control value for focus detection performed in step S306.

In step S501, the system control unit 40 determines whether or not to perform focus detection by also using the defocus amount in the longitudinal direction based on the data of the image C and the image D in the focus detection processing in step S307. For example, when the data of the image C and the image D cannot be used such as a case where the image capturing element 10*a* reads the data by thinning in the vertical direction, the focus detection is performed not in consideration of the defocus amount in the longitudinal direction.

The system control unit 40 proceeds with the processing to step S502 when performing the focus detection also using the defocus amount in the longitudinal direction, and proceeds with the processing to step S503 when performing the focus detection using the defocus amount in the lateral direction.

In step S502, the system control unit 40 determines whether or not a flicker has been detected in the flicker detection processing in step S302. Here, since the focus detection is performed also using the defocus amount in the longitudinal direction, the system control unit 40 proceeds with the processing to step S503 when a flicker has been detected. When no flicker has been detected, the system control unit 40 proceeds with the processing to step S504.

In step S503, the system control unit 40 performs calculation of the exposure control value with priority given to flicker removal so that the flicker is less likely to affect the calculation of the defocus amount in the longitudinal direction. Specifically, the exposure control value (diaphragm, accumulation time, and sensitivity) is determined such that the accumulation time of the image capturing element 10*a* becomes an integral multiple of the flickering cycle (or a value close to it).

FIG. 4A illustrates an example of a program diagram with priority given to flicker removal. FIG. 4A illustrates an example of a case where a flicker of 100 Hz is detected. In FIG. 4A, the horizontal axis represents the accumulation time, the vertical axis represents the diaphragm value, and the sensitivity is omitted.

Since the influence of the flicker can be canceled by setting the accumulation time to an integral multiple of 1/100 [sec], the accumulation time such as 1/100 [sec], 1/50 [sec], and 1/33 [sec] are used as much as possible in the diagram. In particular, the diaphragm is used from F2.8 to F8 at 1/100 [sec]. The diaphragm has an open diaphragm value of F2.8 and a minimum diaphragm value of F8. That is, the accumulation time is maintained not to be shorter than 1/100 [sec] by narrowing down to a small diaphragm even when the subject brightness is high so that the influence of the flicker can be canceled. It is not until the subject is too bright to obtain a correct exposure even if the diaphragm is F8 that the accumulation time is made shorter than 1/100 [sec]. In a case of detecting a phase difference in the longitudinal direction, if a signal that changes in the longitudinal direction such as a flicker is superimposed, a different offset is applied to the signal value depending on the line, which adversely affects the focus detection. In order to avoid this influence, when the phase difference in the longitudinal direction is detected, the exposure control value is determined by giving top priority to flicker removal.

In step S504, the system control unit 40 performs calculation of the exposure control value with priority given to diaphragm opening. In this step, since no flicker is detected, the image quality of live view is now lowered even if a long accumulation time is not secured by narrowing the diaphragm. Therefore, priority is given to focus detection accuracy by opening the diaphragm as much as possible.

FIG. 4B illustrates an example of a program diagram with priority given to diaphragm opening. Since the focus detection accuracy increases when the focus detection is performed in a state where the diaphragm is opened and the depth of field is shallowed, up to the accumulation time 1/4000 [sec] with the diaphragm opening (F2.8) is used in the diagram. In a state where the depth of field is shallow, the image is largely blurred even if the position of the focus lens is slightly shifted, and therefore the image shift is easily detected and the focus detection accuracy increases. Here, assume that 1/4000 [sec] is the shortest accumulation time. That is, it is not until the subject is too bright to obtain a correct exposure even if the diaphragm opening is maintained until the shortest accumulation time and the accumulation time is 1/4000 [sec] so that the accuracy of focus detection increases that the diaphragm is narrowed. When there is no flicker, it is not necessary to pay attention to the accumulation time, and therefore such diagram is used.

In step S505, similarly to step S502, the system control unit 40 determines whether or not a flicker has been detected in the flicker detection processing in step S302. The system control unit 40 proceeds with the processing to step S506 when a flicker has been detected, and proceeds with the processing to step S507 when no flicker has been detected.

In step S506, since the defocus amount in the longitudinal direction is not used for focus detection, the system control unit 40 performs exposure calculation in accordance with the diaphragm at the time of imaging the still image calculated in step S305.

FIG. 4C illustrates an example of a program diagram when a flicker of 100 Hz is detected. In order to avoid a flicker from being superimposed on an image in live view display, the accumulation time of an integral multiple of 1/100 [sec] (or a value close to it) is used as much as possible similarly to the case of the flicker removal priority in FIG. 4A. However, if the diaphragm is narrowed down to the minimum diaphragm (F8) as illustrated in FIG. 4A because of the presence of the flicker, the depth of field is deepened and the focus detection accuracy is lowered. In a state where the depth of field is deep, the image is less likely to be blurred even if the position of the focus lens is slightly shifted, and therefore image shift is less likely to be detected and the focus detection accuracy is reduced.

Therefore, in the example of FIG. 4C, the diaphragm value used for the purpose of removing a flicker for maintaining the image quality of live view display is up to F5.6. Then, when the subject is too bright to obtain a correct exposure even if the diaphragm value is narrowed down to F5.6, removal of the flicker is abandoned, and an accumulation time shorter than 1/100 [sec] is used. F5.6 is a diaphragm value in the exposure control value of the still image calculated in step S305.

When focus adjustment is performed in a state of being narrowed more than the exposure control value of the still image, the depth of field may become shallow and blurring when the diaphragm is opened at the time of imaging. Therefore, the accumulation time 1/100 [sec] is maintained as much as possible within a range where the imaging diaphragm of the still image is a limit (limit value) of a small diaphragm.

If the phase difference not in the longitudinal direction but the lateral direction is detected, even if a signal that changes in the longitudinal direction such as flicker is superimposed, the offset applied to the signal value of the pixel in the lateral direction is the same, and thus the adverse effect on the focus detection accuracy is small. That is, from the viewpoint of focus detection, it is not necessary to perform flicker removal even up to the minimum diaphragm. Therefore, by abandoning flicker removal and setting the accumulation time to be shorter than 1/100 [sec], excessive diaphragm is avoided and focus detection accuracy is secured.

By calculating the exposure control value at the time of focus detection from the program diagram of FIG. 4C, it is possible to achieve flicker removal of a live view image as much as possible without causing defocus in a still image.

If focus detection accuracy allows, a threshold may be determined based on the imaging diaphragm, for example, by setting the limit on the small diaphragm side to be narrowed at the accumulation time 1/100 [sec] not to the diaphragm itself at the time of imaging a still image but to imaging diaphragm−1 stage (narrowed by 1 stage from the imaging diaphragm).

Since no flicker is detected in step S507, the system control unit 40 performs calculation of an exposure control value with priority given to diaphragm opening in order to prioritize the focus detection accuracy. A calculation method of the exposure control value with priority given to diaphragm opening is similar to that in step S504.

As described above, in the present embodiment, when no flicker is detected, priority is given to focus detection accuracy and priority is given to diaphragm opening. On the other hand, when a flicker is detected, the accumulation time in which flicker removal is possible is maintained for flicker removal, and the diaphragm is narrowed. Furthermore, since the degree of influence of the flicker on the focus detection changes depending on the direction in which the phase difference is detected, the limit value on the small diaphragm side of the diaphragm value at the time of narrowing for flicker removal is changed. The focus detection accuracy is secured by performing focus detection processing as much as possible with a diaphragm value opened more than the imaging diaphragm in particular. By determining the diaphragm value at the time of focus detection in this manner, it is possible to remove a flicker and also maintain the quality of live view display while securing focus detection accuracy.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-056359, filed Mar. 30, 2023, which is hereby incorporated by reference herein in its entirety.

What is claimed is:

1. An apparatus comprising:

a sensor that captures a subject image formed by an optical system; and at least one processor; and a memory coupled to the at least one processor storing instructions that, when executed by the at least one processor, cause the at least one processor to function as:

a flicker detection unit that detects a flicker using an image captured by the sensor, a focus detection unit that detects an in-focus state of the subject image by using a light flux that has passed through the optical system, a first determination unit that determines, in a case where the focus detection unit detects the in-focus state, which of a setting of an exposure time of the sensor to an exposure time in which a flicker is inconspicuous and an opening of a diaphragm of the optical system to give priority to based on a detection result of a flicker by the flicker detection unit, and, based on the determination, determines a combination of an exposure time of the sensor and a diaphragm value of the optical system, and a second determination unit that determines a diaphragm value, which is a diaphragm value in a case where the sensor images a still image, wherein in a case where the flicker detection unit detects a flicker, the first determination unit determines a combination of an exposure time of the sensor and a diaphragm value of the optical system in a case where the in-focus state is detected with the diaphragm value as a limit on a small diaphragm side, wherein in a case where the flicker detection unit detects a flicker, the first determination unit determines a combination of an exposure time of the sensor and a diaphragm value of the optical system with priority given to setting the exposure time to an exposure time in which a flicker is inconspicuous over to opening a diaphragm of the optical system.

2. The apparatus according to claim 1, further comprising a display device that displays, as a live view image, an image captured by the sensor, in a state where the in-focus state is being detected.

3. The apparatus according to claim 1, wherein in a case where the flicker detection unit detects a flicker, the first determination unit determines a combination of an exposure time of the sensor and a diaphragm value of the optical system so as to open a diaphragm of the optical system within a range in which the exposure time can be maintained to an exposure time in which a flicker is inconspicuous.

4. The apparatus according to claim 1, wherein in a case where the flicker detection unit detects no flicker, the first determination unit determines a combination of an exposure time of the sensor and a diaphragm value of the optical system with priority given to opening a diaphragm of the optical system.

5. The apparatus according to claim 1, wherein the first determination unit sets an exposure time of the sensor to an integral multiple of a flickering cycle as the exposure time in which the flicker is inconspicuous.

6. The apparatus according to claim 1, wherein the second determination unit determines, in a case where the flicker detection unit detects a vertical direction phase difference, with priority to given to setting the exposure time of the sensor to an exposure time in which a flicker is inconspicuous over to opening a diaphragm of the optical system.

7. The apparatus according to claim 1, wherein the second determination unit sets a limit value of the diaphragm on a small diaphragm side to eliminate the flicker difference between in a case where the flicker detection unit detects a phase difference in a vertical direction and in a case where the flicker detection unit detects a phase difference in a horizontal direction.

8. The apparatus according to claim 1, wherein the sensor includes a plurality of pixels each including a plurality of photoelectric conversion units that receive a light flux passing through different pupil regions of the optical system, and the focus detection unit detects the in-focus state based on a shift amount of a signal from a plurality of conversion units of the pixel.

9. The apparatus according to claim 8, wherein the focus detection unit detects the in-focus state by using at least one of a shift amount of the signal in a first direction, which is a reading row direction of the pixel, and a shift amount of the signal in a second direction.

10. The apparatus according to claim 9, wherein the second direction is a direction perpendicular to the first direction.

11. The apparatus according to claim 9, wherein the at least one processor further functions as a second determination unit that determines a diaphragm value, which is a diaphragm value in a case where the sensor images a still image, wherein in a case where the focus detection unit detects the in-focus state without using a shift amount of the signal in the second direction and in a case where the flicker detection unit detects a flicker, the first determination unit determines a combination of an exposure time of the sensor and a diaphragm value of the optical system in a case where the in-focus state is detected with the diaphragm value as a limit on a small diaphragm side.

12. The apparatus according to claim 9, wherein in a case where the flicker detection unit detects no flicker, the first determination unit determines a combination of an exposure time of the sensor and a diaphragm value of the optical system with priority given to opening a diaphragm of the optical system.

13. A method for controlling an apparatus including an sensor that captures a subject image formed by an optical system, the method comprising:

detecting a flicker by using an image captured by the sensor;

detecting an in-focus state of the subject image by using a light flux that has passed through the optical system; and performing a first determination to determine, in a case of detecting the in-focus state in the focus detection, which of a setting of an exposure time of the sensor to an exposure time in which a flicker is inconspicuous and an opening of a diaphragm of the optical system to give priority to based on a detection result of a flicker by the flicker detection, and, based on the determination, determine a combination of an exposure time of the sensor and a diaphragm value of the optical system, and performing a second determination to determine a diaphragm value, which is a diaphragm value in a case where the sensor images a still image, wherein in a case where the flicker detecting detects a flicker, the first determination determines a combination of an exposure time of the sensor and a diaphragm value of the optical system in a case where the in-focus state is detected with the diaphragm value as a limit on a small diaphragm side, wherein in a case where the detecting detects a flicker, the first determination determines a combination of an exposure time of the sensor and a diaphragm value of the optical system with priority given to setting the exposure time to an exposure time in which a flicker is inconspicuous over to opening a diaphragm of the optical system.

14. The method according to claim 13, further comprising displaying, as a live view image, an image captured by the sensor, in a state where the in-focus state is being detected.

15. A non-transitory computer-readable storage medium storing a program for causing a computer to execute each process of a control method for an apparatus including a sensor that captures a subject image formed by an optical system, the method comprising:

detecting a flicker by using an image captured by the sensor;

detecting an in-focus state of the subject image by using a light flux that has passed through the optical system;

performing a first determination to determine, in a case of detecting the in-focus state in the focus detection, which of a setting of an exposure time of the sensor to an exposure time in which a flicker is inconspicuous and opening of a diaphragm of the optical system to give priority to based on a detection result of a flicker by the flicker detection, and, based on the determination, determine a combination of an exposure time of the sensor and a diaphragm value of the optical system, and performing a second determination to determine a diaphragm value, which is a diaphragm value in a case where the sensor images a still image, wherein in a case where the flicker detecting detects a flicker, the first determination determines a combination of an exposure time of the sensor and a diaphragm value of the optical system in a case where the in-focus state is detected with the diaphragm value as a limit on a small diaphragm side, wherein in a case where the detecting detects a flicker, the first determination determines a combination of an exposure time of the sensor and a diaphragm value of the optical system with priority given to setting the exposure time to an exposure time in which a flicker is inconspicuous over to opening a diaphragm of the optical system.

16. The non-transitory computer-readable storage medium according to claim 15, further comprising displaying, as a live view image, an image captured by the sensor, in a state where the in-focus state is being detected.

* * * * *